April 26, 1960     W. G. WHITE     2,934,690
AUTOMATIC PILOT

Filed March 6, 1956     3 Sheets-Sheet 1

INVENTOR.
WILFRID GORDON WHITE
BY
ATTORNEYS

April 26, 1960     W. G. WHITE     2,934,690
AUTOMATIC PILOT

Filed March 6, 1956     3 Sheets-Sheet 2

*INVENTOR.*
WILFRID GORDON WHITE
BY
ATTORNEYS

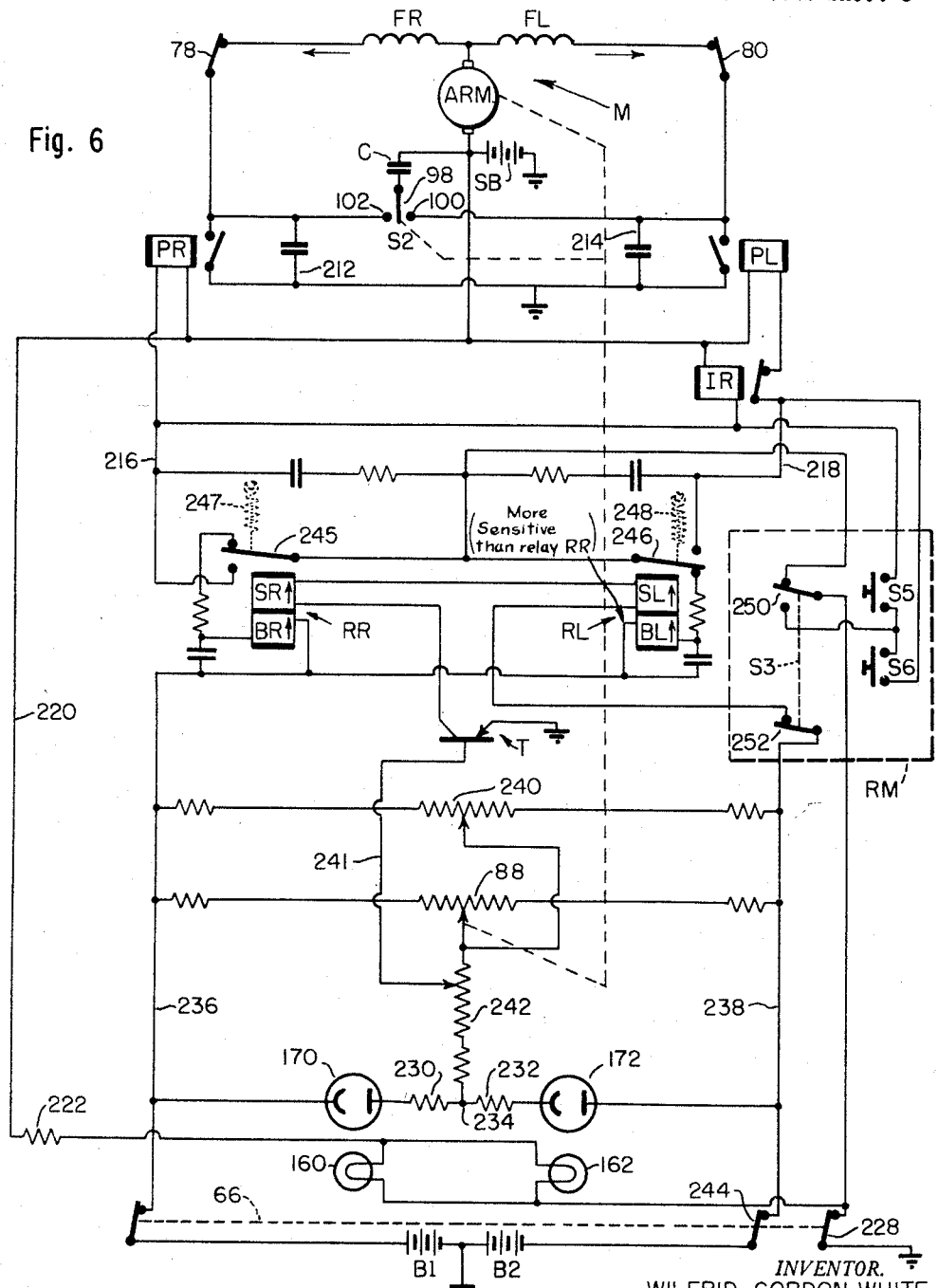

United States Patent Office 2,934,690
Patented Apr. 26, 1960

2,934,690

AUTOMATIC PILOT

Wilfrid G. White, Dover, Mass., assignor to Wilfrid O. White & Sons, Inc., Boston, Mass., a corporation of Massachusetts Application March 6, 1956, Serial No. 569,799

8 Claims. (Cl. 318—489)

The present invention relates to automatic pilots, and more particularly to improved and simplified controls for the automatic steering of vessels upon set courses.

The principal object of any automatic pilot is to eliminate the necessity for constant attention required during manual steering and the consequent physical effort, thus making it possible for the helmsman to leave the wheel to take bearings, lay off new courses, secure loose gear, handle an emergency, or engage in any other activity. By means of a course-setting device operating in conjunction with a compass reading device, the boat is steered on a given heading without attention until the setting is changed.

Further objects of a corollary nature include saving fuel and time and assuring safer landfalls by maintaining close adherence to the course.

Automatic pilots have been the subject of intensive study, developement and use over a period of many years, but ordinarily improvements have resulted in an increase in cost and complexity of apparatus, obviating their use in smaller craft. Certain problems arise from the characteristics inherent in the compass, and others from the automatic circuits and mechanism adapted to measure the departure from course and to apply a proper angle of rudder to compensate therefor. These problems include the possibility of the boat following an erroneous heading, particularly after a change in the course setting.

Vacuum tube embodiments have the further disadvantages of requiring a warm-up time, and often of requiring critical adjustments and expensive repairs. It has long been recognized in navigation that any electrical apparatus likely to be influenced by salt spray, humidity, or other conditions at sea is likely to be unreliable, and should be used only with adequate safeguards and alternative automatic or manual means for use in case of breakdown. Vacuum tube devices are generally of this type, and they have the still further disadvantage of requiring considerable current from the ship's battery during operation.

It is accordingly a particular object of this invention to provide an automatic pilot having no vacuum tube components, and hence requiring a low current drain and no warm-up time.

A further object is to provide an automatic pilot of simple and straightforward design, thereby reducing to a minimum the number of components sensitive to ambient conditions, whereby it becomes feasible to install the pilot in smaller craft.

Another object of the invention is to provide a pilot device that can be turned "on" or "off" at any heading, speed or rudder angle.

Still other objects are to provide a pilot device that is adapted for alternative manual steering by a simple and convenient manipulation of the controls, and that does not cause appreciable drag on the steering mechanism when disengaged and secured.

A further object is to provide a pilot characterized by freedom from critical adjustments and the tendency to "hunt."

With the foregoing and other objects in view, a feature of the present invention resides in the provision of a reversible steering motor which is powered through contacts, of a pair of relays selectively energized by a steering circuit of novel form. This circuit includes a pair of control relays each of the type having two separate windings connected with their respective energizing circuits in aiding relationship.

According to another feature, a coil on each of the control relays is connected in series with the corresponding coil on the other relay, and the current for this series circuit is supplied through a single transistor having a variable input signal derived by photoelectric means from the compass. This photoelectric means consists of a pair of photosensitive devices juxtaposed to continuous sources of light on opposite sides of a suitably supported compass card having a light aperture.

A feature of construction of the compass resides in the spherical construction of the fluid-filled chamber, with the compass card supported at the center of the chamber and the photosensitive devices being situated adjacent the inner wall of the chamber in position to receive light from continuous light sources supported symmetrically thereto adjacent the wall of the chamber on the opposite side of the compass card.

By the foregoing means there is provided a magnetic compass with photosensitive means to derive directional information without application of friction, and apparatus responsive to such information requiring a negligible warm-up time.

A further feature of the invention resides in circuit features that permit the attainment of relatively high sensitivity in system response, without giving rise to self-sustaining oscillations or hunting. Thus the steering motor is powered only when the boat is off course, with commensurately lower power consumption during operation.

According to still another feature, the servomechanism is adapted to take account of the value of the actual rudder angle so as to permit great sensitivity to relatively small departures from course, while resisting any tendency to apply excessive rudder, which might otherwise produce "rudder stalling." This condition is familiar to those skilled in navigation and causes failure of steering at rudder angles above a more-or-less "critical" value. This angle depends upon various factors of design and in a typical instance it might be, for example, 30° from center or thereabouts.

A further feature related to the last-mentioned rudder follow-up control resides in the provision of electrical means for "centering" the controls, thereby permitting the pilot device to be set precisely at the desired conditions necessary for equal response in both directions of steering.

A still further feature resides in the provision of a remote maneuvering device for disengaging the automatic pilot and permitting steering from any part of the boat by means of simple manual or pushbutton controls.

Still other features reside in interlock relay means to prevent application of opposing voltages to the steering motor; in condenser means for preventing overrunning of the steering motor after removal of a steering signal; and in other features of construction, modes of operation and relationships of the parts which will become more evident from the following detailed description of a preferred embodiment of the invention, and from the appended drawings illustrating the same.

In the drawings, Fig. 1 is an oblique diagrammatic view of the rudder-driving mechanism forming a part of the automatic pilot;

Figure 1:
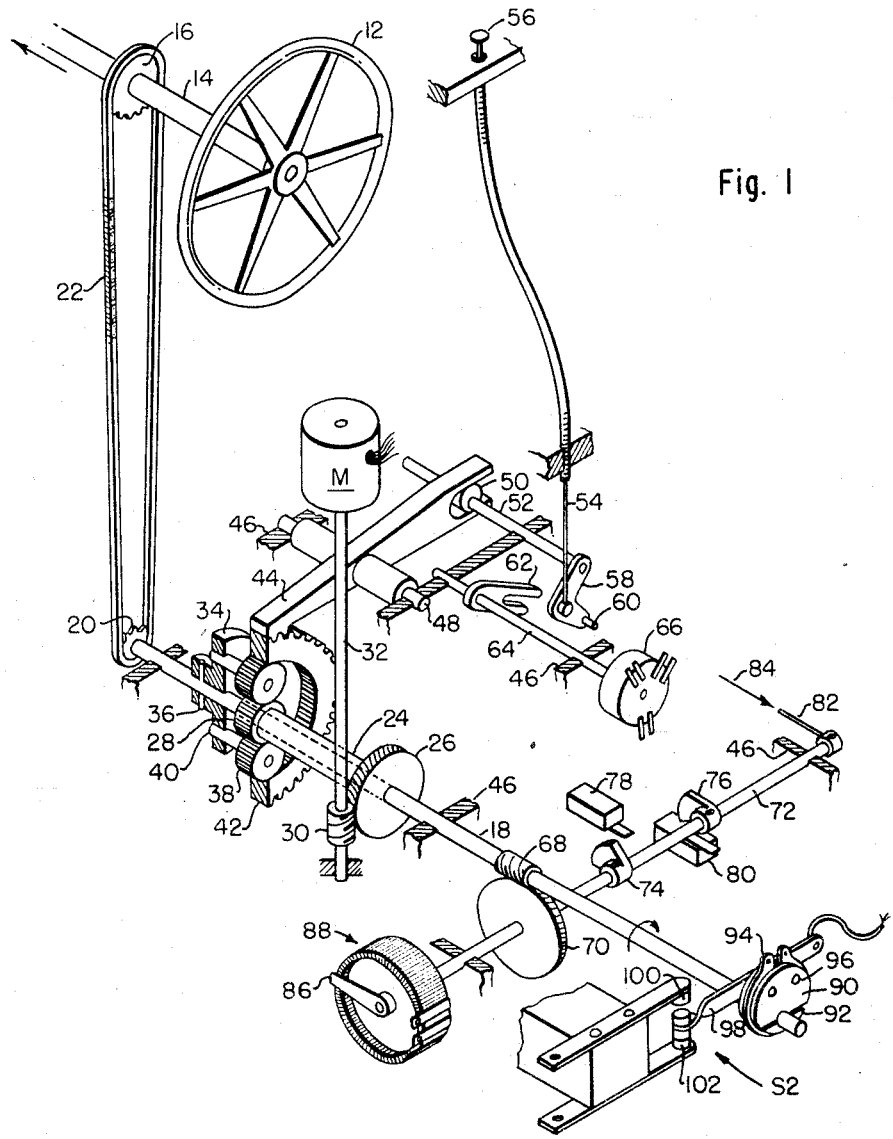
Figure 2:
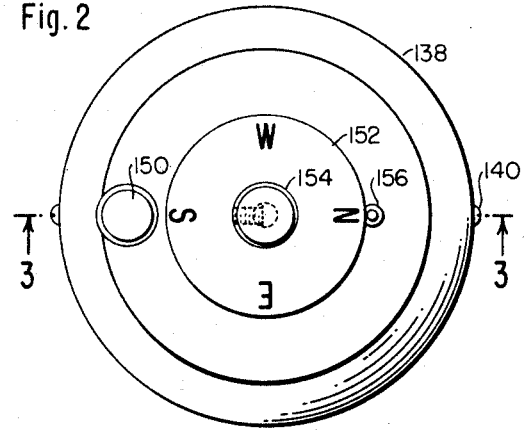
Fig. 2 is a plan view of the binnacle assembly.
Figure 4:
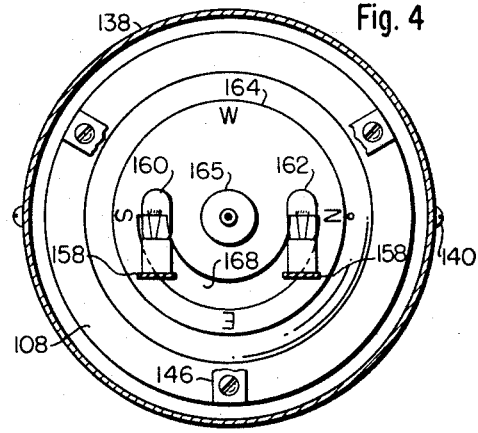
Figure 3:
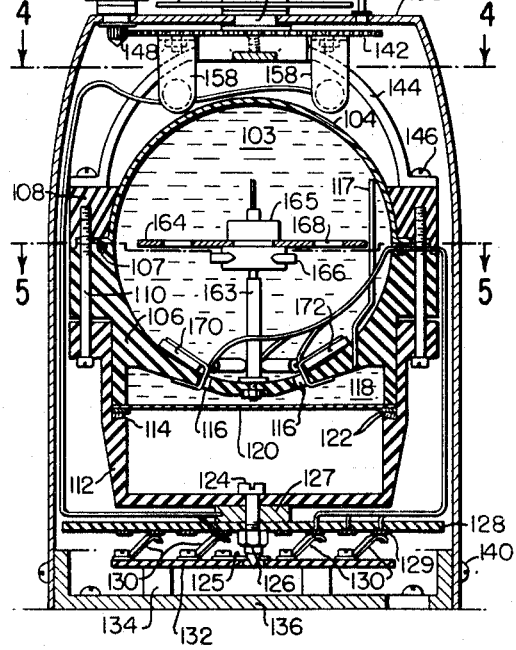
Fig. 3 is a side elevation in section of the binnacle assembly.
Figure 5:
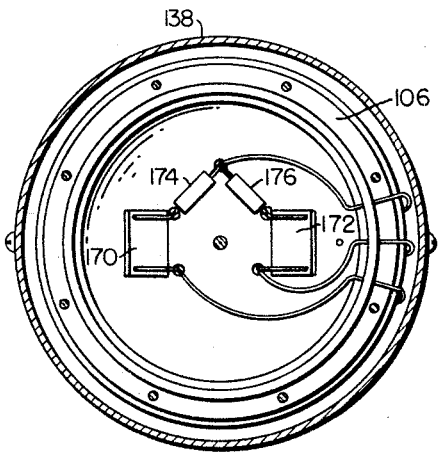

Figs. 4 and 5 are sectional elevations taken respectively on lines 4—4 and 5—5 of Fig. 3; and Fig. 6 is a circuit diagram showing the connections between the binnacle assembly, the mechanism of Fig. 1, and the remote maneuvering device.

Referring to Fig. 1, there is shown a steering wheel 12 and a steering shaft 14 which are parts of the usual manual steering mechanism coupled with the rudder of a boat. A sprocket 16 is secured to the shaft 14. A shaft 18 has a sprocket 20 similarly secured to it, and the sprockets 16 and 20 are coupled by a drive chain 22. Thus the shafts 14 and 18 are at all times coupled, whether the device is set for manual or automatic steering.

A sleeve 24 is slidably received over the shaft 18, and has a worm gear 26 and a sun gear 28 secured to it. A worm 30 secured to a shaft 32 is engaged with the gear 26, the shaft 32 being permanently coupled with the armature of a rudder drive motor M. By reason of the worm and gear coupling, the sleeve 24 may turn only when the motor M revolves; that is, the transmission of motion through the coupling is irreversible and must be applied by the worm 30 to the gear 26.

A member 34 is pinned to the shaft 18 by a pin 36, and rotatably supports a pair of planetary gears 38 by their respective shafts 40. It will be apparent that although only two planetary gears are shown, a greater number may be used if desired. These gears are permanently engaged with the sun gear 28 and with an outer gear 42. For automatic operation, as shown, the gear 42 is restrained from rotating by a toothed stop member 44 pivotally supported in the fixed frame 46 of the mechanism on pivots 48. The member 44 has an endwise longitudinal slot in which is received a cam 50 eccentrically mounted on a rotatable shaft 52. The shaft 52 is rotatable between two limit positions substantially 180 degrees apart by a Bowden wire 54 having a conveniently accessible master control knob 56 adjacent the wheel 12. The wire 54 is secured to a bell crank lever 58, which is in turn secured to the shaft 52.

As previously stated, the mechanism is illustrated in the condition for automatic operation, and the knob 56 is pushed substantially to its downward extremity. The stop member 44 is engaged with the gear 42. Under these conditions the wheel 12 cannot be turned manually because the outer gear 42 is held fixed and the sun gear 28 cannot be moved by the planetary gears 38 because of the irreversibility of the worm coupling to the motor M. However, if the motor M should be rotated, the sun gear 28 is turned, thus turning the member 34 through the planetary gears 38 and driving the shaft 18. This motion is transmitted through the sprocket 20 and the chain 22 to the steering wheel shaft 14.

For manual operation, the knob 56 is pulled upwardly, allowing a pin 60 in the lever 58 to enter a slot in a lever 62 secured to a rotatable shaft 64. In the first part of this motion the eccentric 50 rotates the member 44 to disengage the gear 42. After the pin 60 engages the lever 62 the shaft 64 is rotated through a predetermined angle. The shaft 64 is permanently coupled to the rotating contacts of a two-position rotary switch 66. This switch is provided with conventional stop means fixing the upper limit of movement of the knob 56, and also detent means to hold the knob in either the upper or lower position.

With the gear 42 freed from the stop member 44, the steering wheel may be turned because, although the sun gear 28 is held fixed as long as the motor M is not turning, the planetary gears 38 are free to revolve about the sun gear. As hereinafter described under the heading "Circuit Diagram," the switch 66 deactivates the electrical circuit of the pilot; hence, the motor M is not supplied with current while the mechanism is in position for manual steering.

As hereinafter more fully explained, the automatic pilot is provided with certain controls which function according to the rudder position. These controls are associated with the shaft 18 which, as previously indicated, is always permanently connected with the steering shaft 14. A worm 68 fixed to the shaft 18 is engaged with a worm gear 70 on a shaft 72. A pair of cams 74 and 76 are secured to the shaft 72, each cam being adapted to operate a limit switch 78 or 80 (see also Fig. 6). A pointer 82 is secured to the shaft 72 and when the rudder is centered the pointer is opposite a fixed arrow 84, preferably inscribed on the frame 46. The cams 74 and 76 are respectively adjusted to actuate their associated switches when the rudder is turned through a predetermined angle. In a system actually reduced to practice this angle was 30 degrees from center in either direction, as an example. The function of the limit switches 78 and 80 is further described in conjunction with Fig. 6 under the heading "Circuit Diagram."

Also secured to the shaft 72 is a brush 86 of a "rudder follow-up potentiometer" 88. Thus the position of the brush 86 bears a predetermined relation to the rudder angle.

A circular plastic or phenolic resin disk 90 having a circumferential edgewise groove has an eccentric transverse hole to receive the shaft 18. The disk is also divided along a chord 92, and the two sections of the disk and the shaft are held assembled by a resilient circular metallic lock spring 94 in the groove. A pair of rivets 96 secure a movable contact member 98 to the disk 90. Thus the member 98 is movable through a friction drive from the shaft 18 between a pair of fixed contacts 100 and 102. The electrical circuit associated with these contacts is more fully described in conjunction with Fig. 6, and has as its purpose the stopping of the armature of the motor M immediately after current is removed therefrom by operation of the relays. This assists in preventing overshooting of the rudder beyond correct steering position upon the removal of a steering signal.

Binnacle assembly

The binnacle assembly is shown in Figs. 2 through 5 and consists of the compass and its housing. The compass is supported within a spherical chamber 103 formed by a hemispherical dome 104 of clear plastic or glass and an inner bowl 106 of phenolic resin or other suitable material having a similar hemispherical inner wall. Between these two parts is a sealing gasket 107. An annular top ring 108 is fitted over the dome 104 and is provided on its under surface with a depending flange or skirt adapted to fit about an annular shoulder formed by rabbeting the inner bowl 106. The ring 108, the dome 104 and the bowl 106 are secured together by a number of screws 110 uniformly spaced about the spherical chamber. Also secured to this assembly is a dished and outwardly flanged outer bowl 112, preferably of the same material as the bowl 106, the bowl 112 having an inner annular shoulder 114. The bowl 106 has holes 116 by which the space 103 communicates with a space 118, and the bowl 106 also supports an upwardly extending length of wire 117 to serve as the lubber's line. The space 118 is sealed by a flexible circular plastic diaphragm 120 having gaskets 122 resting upon the shoulder 114. The function of the expansible space 118 is to accommodate thermal expansion of fluid within the spherical chamber 103. This chamber is entirely filled with oil or some other fluid for damping the compass card, having a finite but limited viscosity over a wide range of ambient temperatures. The fluid is introduced to the chamber through a suitable threaded hole in the inner bowl, filled by a plug screw, not shown. When this fluid expands, the diaphragm 120 deflects downwardly to increase the volume of the space 118.

The foregoing assembly is pivotally supported at its lower end on a pivot 124 resting on a pivot plate 125, the pivot being secured by a nut 126. Also secured by the nut are a metallic spacer 127 and a contact plate 128 having four slip rings 129. Fixed brushes 130 resiliently bearing upon the slip rings are screwed to a plate 132 mounted on posts 134, the posts 134 being secured in turn to a base plate 136 screwed or otherwise firmly secured to the deck.

A generally cylindrical cover 138 is secured by screws 140 to an upwardly turned flange of the base plate 136, thus forming a light-tight housing about the chamber 103. In its top face the cover 138 has a central hole in which is received a stud shaft 140 pivotally supporting the compass assembly at its upper end. The shaft 140 is secured to a gear 142. The gear is secured to a spider 144 having its legs secured by screws 146 to the ring 108. A pinion 148 is engaged with the gear 142, the pinion being rotatably supported in a hole in the cover 138 and provided with a knob 150 for changing the course. A disk 152 bearing a compass rose is secured to the shaft 140 and a hub 154 immediately above the cover. A post 156 is secured to the cover adjacent the rose for indicating the setting. Also secured to the gear 142 are a pair of brackets 158, each supporting an incandescent lamp 160 or 162 adjacent the dome 104.

A post 163 is vertically supported within the chamber 103 so as to extend radially upward to support a compass card 164 approximately in a diametral plane. The card 164 is secured to a hub 165 which is in turn pivoted about the post 163 by any suitable means allowing sufficient freedom of deviation of the card from a perpendicular relationship to the post as the boat pitches and rolls. Suitable means, preferably including a jewel bearing in the tip of the post, are well known in the art and form no part of the present invention. Hence, they are not described in further detail here. The hub 165 also supports one or more slugs 166 of permanently magnetized material to impart pole-seeking properties to the rotatable compass card.

In order that the compass may generate electrical signals for course correction upon departure of the vessel from a predetermined heading, the card 164 has a semicircular slot 168 having a diameter approximately equal to the distance between the lamps 160 and 162. A pair of photosensitive devices 170 and 172 are supported adjacent the inner wall of the chamber 103 in positions to receive the light from the lamps 160 and 162 when the slot 168 on the compass card is rotated in line therewith. These photosensitive devices are of any suitable known type, but are preferably variable impedance devices of the type that have substantial impedance in total darkness and decreasing impedance as a function of light impinging thereon. In a tested system considerable success was achieved with glass plates having grids of conductive metal (e.g. gold) embossed thereon, and also having a coating consisting of a dispersion of cadmium sulphide particles. This construction is well known to the art and has been used in photographic exposure meters. The devices 170 and 172 are connected with isolating resistors 174 and 176, and three connection wires are brought out through the wall of the chamber 103 for connection to three of the slip rings on the plate 128. The fourth slip ring is connected with one of the common leads from the lamps 160 and and 162 (see Figs. 3 and 6), the other lead from the lamps being soldered to the spacer 127 which, through the pivot 124, contacts the fixed metallic pivot plate 125. To insure a good electrical connection the spacer 127 is preferably soldered to the pivot 124.

It will be seen from the above that the binnacle assembly consists essentially of a compass card pivotally supported within a spherical chamber 103 filled with a damping fluid, the chamber forming a part of an adjustably pivoted assembly in a light-tight compartment, and being provided with photoelectric detecting means including a pair of photosensitive devices 170 and 172 and incandescent lamps 160 and 162. When the boat is on course, the lamps 160 and 162 are situated with respect to the slot 168 in the compass card 164 substantially as illustrated in Fig. 4, whereby an equal amount of light reaches each of the devices 170 and 172. In that case the magnetic bearing of the boat is indicated by the position of the pointer 156 in relation to the compass rose on the disk 152. A departure of the boat to one side of this heading results in one of the photosensitive devices 170 or 172 receiving more light than the other, and the relationship is reversed for a departure in the other direction. Connections are made from the lamps and photosensitive devices via the brushes 130 and the bearing plate 125 in the base of the binnacle unit to the circuit shown in Fig. 6 which controls the steering motor M (Fig. 1).

*Circuit diagram*

The operation of the mechanism of Fig. 1 is controlled by the circuit of Fig. 6 which included the photosensitive elements 170 and 172 of the compass unit. It will be understood that the various circuit elements of Fig. 6 are illustrated in the relative positions best showing the mode of operation. In actuality, a preferred installation embodying the invention is divided into four units or chassis interconnected by cables, the binnacle unit (Figs. 2 to 5) which houses the compass and photosensitive elements, a motor gear box which houses the mechanism of Fig. 1, a remote maneuvering device RM outlined with broken lines in Fig. 6, and the amplifier-relay chassis which houses the balance of the circuit shown in Fig. 6.

As previously stated, the steeering wheel shaft 14 (Fig. 1) is secured to a drive sprocket 16 which is turned by a chain 22 during automatic operation. Power is delivered to the chain from a second sprocket 20 which is secured to a shaft 18. The reversible drive motor M has a worm gear 30 mounted upon its armature shaft and permanently coupled to a gear 26, the gear 26 being coupled through the planetary gear assembly with the shaft 18. For automatic operation the stop member 44 is rotated into engagement with the external teeth of the gear 42.

Power to drive the motor M is supplied by a battery SB (Fig. 6), which is preferably the ship's battery. The motor has two field coils, a coil FR which causes the motor M to turn the rudder to steer right, and a coil FL which causes the motor to turn the rudder to steer left. Current flows through the coils FR and FL in the directions indicated by the arrows. The coils are selectively connected in series with the armature of the motor M by closure of the contacts of power relays PR and PL. The contacts of the relays PR and PL are protected against arcing by suitable condensers 212 and 214. The field circuits also include limit switches 78 and 80 (Fig. 1), each of which is normally closed during operation of the pilot but opened if the rudder angle exceeds a predetermined limit. In the previously mentioned system reduced to practice these switches opened respectively at rudder angles of 30 degrees on each side of center. Thus for a change of course requiring a relatively large rudder angle, the rudder reaches and maintains a maximum deflection of 30 degrees until a smaller angle is required as the new course becomes established.

The motor circuit is also provided with a damping capacitor C controlled by the switch S2. This switch is shown in Fig. 1 and includes the fixed contacts 100 and 102 and the movable contact 98. When the relay PR is energized the shaft 18 rotates in the direction indicated by the arrow in Fig. 1 and the contacts 98 and 100 are continuously urged closed by the friction drive including the disk 90, thus causing the capacitor to charge. When the relay PR is deenergized the capacitor discharges through the coil FL in the direction indicated by the arrow, thus opposing the magnetic field in the coil FR and preventing overrunning of the armature of the motor and the rudder. When the shaft 18 rotates in the direction opposite to that just indicated, the contacts 98 and 102 are closed and opening of the contacts on the relay PL causes the capacitor to discharge through the coil FR, opposing the field of the coil FL with the same result.

The operation of the balance of the circuit in Fig. 6 is for the purpose of energizing either the relay PR or the relay PL when the vessel is off course, and for causing such relay to remain energized a sufficient length of time to rotate the rudder through the appropriate angle. The coils of the relays PR and PL have the positive side of the ship's battery SB as a common connection. The relay PR is energized by grounding a lead 216 and the relay PL by grounding a lead 218. If these two leads should become energized simultaneously for any reason, only the relay PR is energized. This bias in favor of the relay PR is produced by an interlock relay IR having a break contact in series with the connection between the lead 218 and the relay PL. While simultaneous energization of the leads 216 and 218 is not a normal condition in the circuit, it may be brought about by inadvertent operation of the remote maneuvering device, as for example by simultaneously depressing push buttons S5 and S6 of the remote maneuvering device, hereinafter more fully described.

The following description explains how the leads 216 and 218 are selectively grounded to steer the boat. Ship's battery SB is connected by a lead 220 and a resistor 222 with the incandescent lamps 160 and 162 mounted in the binnacle unit adjacent the upper side of the compass card 164. This connection is made through a slip ring such as 129 (Fig. 3) and a brush 130, with the return connection being made through the pivot 124. The circuit is closed through contacts 228 of the switch 66, which are closed during automatic operation when the master control handle 56 is pushed down as shown in Fig. 1.

If the boat is bearing precisely on course, the photosensitive devices 170 and 172 receive equal amounts of light. Resistors 230 and 232 are equal, and hence a connection 234 reaches a potential equally dividing that between leads 236 and 238, the latter leads being connected to opposite terminals of equal "B" batteries B1 and B2, grounded at their mutual connection. Therefore the connection 234 is then substantially at ground potential.

The photosensitive devices 170 and 172 form a bridge network with the rudder follow-up potentiometer 88 and a manually-operated centering potentiometer 240. The bridge network is connected to the emitter-base circuit of a suitable transistor T of conventional form. The output circuit includes a wire 241 connected with the movable contact of a potentiometer 242. The respective functions of the potentiometers 88, 240 and 242 are hereinafter further described. For the assumed case of a boat bearing precisely on course, the adjustments are such that the potential of the base with respect to the grounded emitter produces a predetermined collector current. The collector circuit includes a pair of coils SR and SL in series, and is completed to the battery B2 through normally-closed break contacts of a switch S3 in the remote maneuvering device RM and break contacts 244 of the switch 66. By way of illustration, this current in the previously mentioned system reduced to practice was 5.1 milliamperes (ma.).

If the bearing of the boat becomes off course to the left, the photosensitive device 170 receives more light from the lamp 160 (see Fig. 4) and hence becomes more conductive, while the photosensitive device 172 receives less light from its lamp 162 and becomes less conductive. This causes the potential at the connection 234 to become more positive, relative to the grounded midpoint between batteries B1 and B2, and a portion of this positive change is reflected in the potential at the lead 241. This causes an increase in the collector current passing through the coils SR and SL. Conversely, if the boat becomes off course to the right, the photosensitive device 172 becomes more conductive, thus decreasing the potential at the connection 234 and causing a decrease in the collector current in the transistor.

The coils SR and SL are referred to as the "steering" coils, the coil SR forming one winding of a relay RR and the coil SL similarly forming a winding of a relay RL. Each of these relays has a transfer blade 245 or 246 and a bias coil BR or BL. In each relay the blade is urged by a tension spring 247 or 248 in a direction to increase the air gap in the magnetic path. It will be understood that each relay is of the type having two coils, in which the connections thereto are additive or aiding in their effect on the magnetic flux attracting the blade. In actuality, the structure of the relays may take any one of several forms well known to the art, and are shown in the drawing simply by a conventional symbol. Such forms usually include a pivoted armature for completing a portion of the magnetic path and engaging with the blade. These details of structure will be readily appreciated by one skilled in the art and are not further described herein.

It should also be noted with reference to the relays RR and RL, that while a magnetic field of a certain intensity is necessary in each case to attract the blade, a lower magnetic field is sufficient to maintain it in the attracted position. In addition, the relay RL is more sensitive than the relay RR, and its blade is attracted by a less intense magnetic field than that which is necessary to attract the blade of the relay RR. Thus when the boat is on course, the predetermined current carried by the steering coils SR and SL is not enough to attract the blade 245 even though the bias coil BR is also energized. However, this current in the steering coil SL is enough to attract the blade 246 with the bias coil BL being also energized. It is apparent that under this condition neither of the wires 216 nor 218 is grounded and neither of the power relays PR nor PL is energized.

In the drawing the blade 245 is shown in the unattracted position, while the blade 246 is shown attracted, this being the condition of the circuit when the automatic pilot is in operation with the boat on course. The blades are connected in common and grounded through now-closed break contacts 250 of the switch S3 on the remote control unit and the now-closed contacts 228 of the switch 66. Thus the output lead 218 is grounded when the blade 246 is unattracted, while the output lead 216 is grounded when the blade 245 is attracted. In either case, when the output lead 216 or 218 is not grounded, ground is supplied through the blade 245 or 246 to the bias coil BR or BL, as the case may be. The current in the bias coils is necessarily constant, since one side of each of these coils is directly connected with the lead 236, and the other side of each coil is either open or grounded depending upon the position of the blade 245 or 246. In the system previously mentioned, this current was 0.8 ma., for example.

We may now consider the operation of the unit in response to departures of the boat from the compass setting. For this purpose it is convenient to discuss the operation in terms of the value of collector current in the transistor T since, as has been previously stated, this current has a predetermined magnitude, 5.1 ma. in the example, for an on-course heading, and varies above or below this value depending in part upon the extent and direction of departure from the compass setting. It will be shown at a later point, however, that the collector current is not solely a function of the departure measured by the compass through the photosensitive devices 170 and 172, but also of the rudder angle, since the feedback potentiometer 88 is operated by the rudder steering train. Therefore, the collector current in the transistor is in reality a function of two variables; the bearing departure of the vessel and the rudder angle relative to the vessel.

The above-described condition of the circuit continues, using the given example for illustration, as the collector current is increased from 5.1 to 5.7 milliamperes, representing a finite but small departure to the left of course, ordinarily less than one degree in magnitude. When the current reaches 5.7 ma. the magnetic field of the relay RR becomes sufficiently intense to attract the blade 245, thereby causing the output lead 216 to be grounded. It will be observed that this also removes current from the bias coil BR, but since this does not occur until after the blade has been attracted, the loss of magnetic attraction afforded by this current is not sufficiently great to cause the blade to return to its unattracted position.

This condition of the circuit persists for any value of collector current above 5.7 ma., whereby the motor M causes a continuously increasing deflection of the rudder steering the boat to the right as long as the blade 245 remains attracted. Under normal conditions the bearing approaches the course setting so that the collector current eventually is reduced below 5.7 ma. However, the blade 245 remains attracted until the collector current is reduced to 5.4 ma. for the reason previously indicated. When the blade 245 is released the circuit to the motor M is opened and the controls are in the "on-course" condition. The motor M is quickly stopped by the discharge of the condenser C through the winding FL in the direction indicated by the arrow in Fig. 6, as explained above.

If the boat departs to the right of course, the photosensitive device 172 receives increasing light and hence becomes more conductive, while cell 170 receives less light and its impedance increases. This makes the potential of the connection 234 more negative, thereby decreasing the collector current in the transistor T. When this current is reduced to a value of 4.5 ma. the field of the relay RL is no longer sufficiently strong to hold the blade 246 attracted even though the bias coil BL is carrying a current of 0.8 ma. The blade 246 therefore falls back, causing the output connection 218 to be grounded. If the collector current should decrease to any value below 4.5 ma. this condition of the circuit persists.

As the boat moves toward the on-course heading, the collector current increases, but is not sufficiently strong to attract the blade 246 until it reaches a value of 4.8 ma. At that current value the blade 246 is attracted, and the circuit is brought back to the "on-course" condition.

In the system reduced to practice and described above for illustration, the circuit parameters were so selected and adjusted that a range of departures from true course subtending approximately one degree is permitted before the motor is energized to apply a rudder correction. In normal operation departures within this range tend to average out, although in case a closer control is desired, the range may be decreased to any desired fraction of a degree by adjusting the relays RR and RL to attract their armatures at collector currents more closely equal to the "on-course" value. In that case the relay RR would be made more sensitive and the relay RL less sensitive. However, an appreciable "dead angle," so-called, is preferable in order to reduce the tendency of the circuit to "hunt" and thus cause substantially continuous operation of the steering motor.

As previously stated, the voltage applied to the emitter-base circuit of the transistor T is a function of the error signal from the photosensitive devices 170 and 172, and also of the positions of the potentiometers 240, 88 and 242.

One of the conditions governing the potentiometer settings is that which pertains to the "on-course" heading. For this heading the connection 234 is substantially at ground potential. The common potential at the movable contacts of the potentiometers 240 and 88 is positive. A portion of this positive voltage appears at the movable contact of the potentiometer 242 and at the base of the transistor. This gives rise to a predetermined collector current, which in the tested system was 5.1 ma.

A departure to the left of course gives rise to a positive increase in the potential of the connection 234, and hence to a corresponding positive increase in the voltage applied to the transistor. Conversely, a departure to the right causes the potential of the connection 234 to become more negative, and hence to cause a like change in the voltage applied to the transistor.

As the motor M rotates the rudder in response to a bearing departure signal, the movable contact of the potentiometer 88 is correspondingly moved. This movement is to the left as viewed in Fig. 6 when the rudder steers to the left, and to the right when the rudder steers to the right. Thus if the boat departs to the left of course, tending to cause an increase in the transistor current, the change in the potentiometer 88 resulting from the responsive movement of the rudder tends to decrease the transistor current to some extent.

As a result, the circuit applies a relatively large potential to the transistor for a given bearing deviation if the rudder is centered, and a decreasing potential for the same bearing departure resulting from the appropriate responsive deflection of the rudder. In other words, the circuit is progressively desensitized with an increasing rudder deflection, thus tending to prevent the application of excessive rudder deflections and to produce a smooth steering movement of the boat, which is particularly noticeable when the helmsman introduces a radical change in course at the binnacle unit.

The same considerations apply when the movable contact of the potentiometer 88 moves to the left as viewed in Fig. 6, corresponding to a bearing departure to the right of course and a responsive movement of the rudder to steer toward the left. In this case an increasing rudder deflection tends to counteract in part the effect of the negative potential at the connection 234.

The potentiometer 240 is connected in the same way as the potentiometer 88 and is provided with a manual adjustment knob. By this means it is possible to set the potentiometer 88 at a given position for a zero rudder deflection, and then to make adjustments in the potentiometer 240 until the emitter-base current in the transistor is at the desired value for the on-course heading. The manually adjusted potentiometer 242 is used as a "ratio control," and from the foregoing discussion it will be apparent that its function is to determine the sensitivity of the transistor to the bearing departure signal at the connection 234. Thus upward movement of the contact on the potentiometer 242, as viewed in Fig. 6, decreases the sensitivity of the circuit to bearing departures, and downward movement increases the sensitivity.

The circuit is also preferably adjusted so that variations in the signal applied to the transistor are produced only for bearing departures within a predetermined angle less than the limit value set by the switches 78 and 80 on either side of center. In the system reduced to practice and discussed above, this angle was 18 degrees, whereby a bearing departure of more than that angle in either direction produced substantially the same error signal at the connection 234 as a deflection equal to that angle. This feature tends to limit the response of the device to the normal range of steering operation, and to result in smoothness of steering.

Remote maneuvering device

During operation of the automatic pilot, it may occasionally be necessary to take over manual control for a short time to perform a dodging maneuver or for some other reason. One method of doing this is to pull up the master control knob 56, whereby the switch 66 is opened and the circuit is put out of action and secured. The rudder may then be turned by the steering wheel 12.

According to this invention, another alternative control is provided, which consists of a portable remote maneuvering control box RM containing the switches S3, S5 and S6, this box being connected with the pilot circuit through a six-wire cable of substantial length, enabling the vessel to be maneuvered from any desired point remote from the steering wheel.

The switch S3 is a toggle switch having two stable positions, the position shown in Fig. 6 corresponding to automatic operation as previously described, and the opposite position corresponding to operation from the remote maneuvering device. The switches S5 and S6 are of the push-button type, and are closed only while held depressed.

When the switch S3 is operated for remote maneuvering, ground is removed from the steering coil circuit by opening of contacts 252 and neither of the blades 245 or 246 is attracted. The ground connection to the blades is also removed by the contacts 250. For steering to the right the switch S5 is depressed, thereby energizing the relay PR by grounding the lead 216 through make contacts of the switch S3. For steering to the left the switch S6 is depressed, thereby grounding the lead 218. As in the case of automatic operation, the limit switches 78 and 80 prevent the rudder from reaching an angle of more than a predetermined value on either side of center. To return to automatic operation the switch S3 is merely returned to its original position.

From the foregoing description of the structure and operation of the invention, it will be appreciated that, although all of the essential properties of a convertible automatic and remote pushbutton pilot device are provided, considerable simplification has been achieved. As a result, it becomes feasible to employ the invention in smaller craft where space for installation is likely to be limited. In use as an automatic pilot, immediate accurate response automatically and smoothly follows upon each new course setting of the binnacle unit. The helmsman is merely required to rotate the knob 150 until the desired heading on the compass rose is opposite the fixed pointer 156. The boat automatically maintains the desired heading, allowing only a small bearing departure before application of corrective rudder. When at the wheel, the helmsman may take over positive manual control simply by pulling up the master control knob 56. At any time while the pilot is on automatic operation, it may be disengaged simply by moving the toggle switch S3 on the remote maneuvering device RM, after which steering may be accomplished remotely by means of the two pushbuttons S5 and S6. Automatic operation is resumed simply by moving the switch S3 back to its original position, after which the course setting on the binnacle unit becomes immediately effective.

It will be understood that the foregoing description of a preferred embodiment of the invention has been given solely for the purpose of facilitating a clear understanding thereof, and that such modifications in design, structure or arrangements of the parts as would occur to one skilled in the art upon a reading of the description are within the spirit and scope of the invention.

Having thus described the invention, I claim:

1. A pilot control having, in combination, a transistor, a pair of relays having coils connected in series with the emitter-collector circuit of the transistor, a voltage source in series with said coils in said circuit, said relays having differing sensitivities, a compass having setting means, a pair of photosensitive elements in the emitter-base circuit of the transistor, a light source, a compass card adapted to modulate the emitter-base current through modulation of the light from said source reaching said elements as a function of the departure from the set course, said emitter-base current causing attraction of the armature of only one of said relays when the heading is on course, and steering means responsive to the armature positions of said relays.

2. A pilot control having, in combination, a device having at least three terminals and an impedance between two of the terminals varying with the voltage applied between one of said terminals and the third terminal, a pair of relays and a voltage source connected in series with said variable impedance, said relays having differing sensitivities, a compass having setting means and means adapted to vary said first recited voltage according to the departure from the set course, the current in said relays causing attraction of the armature of only one of said relays when the heading is on course, and steering means responsive to the armature positions of said relays.

3. A pilot control having, in combination, a device having at least three terminals and an impedance between two of the terminals varying with the voltage applied between one of said terminals and the third terminal, a pair of relays and a voltage source connected in series with said variable impedance, said relays having differing sensitivities, a compass having setting means, a pair of photosensitive elements, a light source, a compass card adapted to modulate the light from said source reaching said elements as a function of the departure from the set course, a bridge network including said photosensitive elements to vary said first recited voltage in a corresponding manner, the current in said relays causing attraction of the armature of only one of said relays when the heading is on course and causing attraction or non-attraction respectively of both said armatures when the heading is off course in one or the other direction, and steering means responsive to the armature positions of said relays.

4. A pilot control having, in combination, a device having at least three terminals and an impedance between two of the terminals varying with the voltage applied between one of said terminals and the third terminal, a pair of relays and a voltage source connected in series with said variable impedance, said relays having differing sensitivities, steering means responsive to the armature positions of said relays, and a compass having setting means, means adapted to produce a variable voltage according to the departure from the set course, a ratio-control impedance adapted to apply a variable portion of said last-mentioned voltage to said device to vary its said impedance, the current in said relays causing attraction of the armature of only one of said relays when the heading is on course.

5. A pilot control having, in combination, a device having at least three terminals and an impedance between two of the terminals varying with the voltage applied between one of said terminals and the third terminal, a pair of relays each having two windings connected in aiding relationship, one winding of each relay being in series with said variable impedance, a voltage source in series with said variable impedance, contacts for the relays to energize the other winding of each relay in only one position of its armature, said relays having differing sensitivities, a course heading reference, means adapted to vary said voltage according to the departure from the set course, the current in said windings causing attraction of the armature of only one of said relays when the heading is on course, and steering means responsive to the armature positions of said relays.

6. A pilot control having, in combination, a device having at least three terminals and an impedance between two of the terminals varying with the voltage applied between one of said terminals and the third terminal, a pair of relays and a voltage source connected in series with said variable impedance, said relays having differing sensitivities, reversible steering means, a compass having setting means and means adapted to vary said first recited voltage according to the departure from the set course, the current in said relays causing attraction of the armature of only one of said relays when the heading is on course, circuit means to power said steering means through the contacts of said relays, and a remote maneuvering device including switches for closing said circuit means independently of said relays.

7. A pilot control having, in combination, a device having at least three terminals and an impedance between two of the terminals varying with the voltage applied between one of said terminals and the third terminal, a first pair of relays and a voltage source connected in series with said variable impedance, said first pair of relays having differing sensitivities, reversible steering means, a course heading reference, and means adapted to vary said voltage according to the departure from the set course, the current in said first pair of relays causing attraction of the armature of only one of said relays when the heading is on course, a second pair of relays adapted to power said steering means through the contacts of said relays, the contacts of said second pair of relays being adapted to remain open in the on-course condition of said first pair, and a remote maneuvering device including switches for opening said series circuit and closing said second pair of relays independently of said first pair of relays.

8. The apparatus of claim 7 wherein said steering means comprise in combination, a steering shaft, a motor engaged with the shaft, the motor having a pair of field coils and an armature each having a connection in common, a source of electrical energy, means to complete a circuit from the source through the armature and one of said field coils in series, a condenser, and a friction-driven transfer switch on said shaft to connect the condenser across the armature and the unenergized field coil in series while said circuit is completed, whereby when said circuit is opened the condenser discharges through the last-mentioned coil in the appropriate direction to exert a braking force on said armature.

References Cited in the file of this patent

UNITED STATES PATENTS

| | | |
|---|---|---|
| 1,662,133 | Smith | Mar. 13, 1928 |
| 2,228,078 | Gulliksen | Jan. 7, 1941 |
| 2,306,784 | Lord | Dec. 29, 1942 |
| 2,340,175 | Chance | Jan. 25, 1944 |
| 2,342,105 | Jacobi | Feb. 22, 1944 |
| 2,387,795 | Isserstedt | Oct. 30, 1945 |
| 2,446,299 | Nelsen | Aug. 3, 1948 |
| 2,468,653 | Bridges | Apr. 26, 1949 |
| 2,472,566 | Brown et al. | June 7, 1949 |
| 2,498,223 | Rommel | Feb. 21, 1950 |
| 2,579,336 | Rack | Dec. 18, 1951 |
| 2,609,513 | Boucher et al. | Sept. 2, 1952 |
| 2,777,070 | Stamper et al. | Jan. 8, 1957 |

FOREIGN PATENTS

| | | |
|---|---|---|
| 728,615 | Germany | Nov. 30, 1942 |

OTHER REFERENCES

Publication, "Using a Transistor to Increase Relay Sensitivity," Radio and Television News, June 1953, page 39.